Dec. 27, 1966   D. A. KONOMOS   3,293,790

FISHING LURE

Filed Nov. 27, 1964

INVENTOR.
DEAN A. KONOMOS
BY Alfred R. Fuchs
ATTORNEY

United States Patent Office 3,293,790
Patented Dec. 27, 1966

3,293,790
FISHING LURE
Dean A. Konomos, Raytown, Mo., assignor to
Patricia J. Konomos, Raytown, Mo.
Filed Nov. 27, 1964, Ser. No. 415,569
3 Claims. (Cl. 43—44.2)

My invention realtes to fishing lures, and more particularly to a bait holder for fishing lures.

It is a purpose of my invention to provide a fishing lure that is provided with bait holding means that is adapted to be used either with live or artificial bait to hold it in desired position, and which is of such a character that the bait can be placed in position to be held thereby and removed therefrom without destroying the bait, permitting the bait to be re-used, whether live or artificial bait. My improved bait holding means for a fishing lure is adapted to be used for holding live bait, such as worms, minnows and crayfish, pork strips, pork chunks, artificial worms, and other artificial bait.

More specifically my invention comprises a bait holder for a fishing lure comprising a straight rigid rod-like bait impaling member, which is sharpened at one end thereof to provide bait penetrating means thereon at said end of said impaling member, said rod-like member having an externally threaded portion adjacent said tapered end thereof which extends inwardly from said tapered end, and with which an internally threaded member of a tubular character engages, said internally threaded member extending endwise from the rod-like member and being provided with hook means.

It is a further purpose of my invention to provide a bait holder of the above referred to character that is provided with a spring bait gripping member mounted on said rod-like member adjacent the end thereof opposite the threaded end, which gripping member has end portions that extend toward each other, that are pointed or sharpened to enter into the bait to hold it at the opposite end thereof from the end thereof engaged with the sharpened end of the impaling member.

The bait holder that is provided in my fishing lure is of such a character that it can be used for casting, trolling, or working on the bottom of a body of water.

For trolling, my improved fishing lure is provided with a deflector plate, which will tend to cause the bait holding rod-like member to be positioned at an inclined angle, said deflector plate being mounted on the end of the rod-like member adjacent which the spring gripping means is provided, said deflector plate being preferably mounted endwise beyond the gripping means.

My improved bait holding means is also adapted to be used with a lead head or weighted member provided thereon for use on the bottom of a body of water, said weighted member being located also at the end of the rod-like member opposite the sharpened end beyond the gripping means. Such a weighted fishing lure can also be provided with either a hackle or a spinner in conjunction with my bait holding means.

Other objects and advantages of my invention will appear as the description of the drawings proceeds. I desire to have it understood, however, that I do not intend to limit myself to the particular details shown or described, except as defined in the claims.

Figure 1:
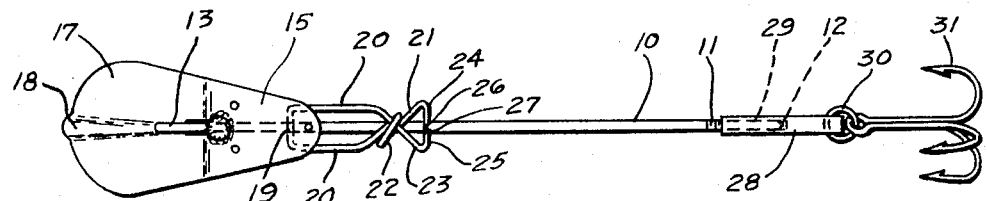
FIG. 1 is a plan view, slightly enlarged, of my fishing lure embodying my improved bait holding means, that is provided with a deflector plate.
Figure 2:
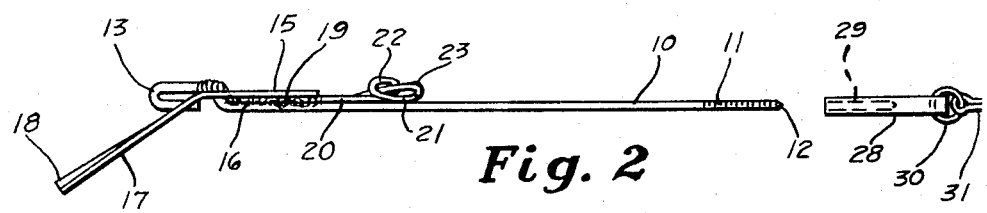
FIG. 2 is a side elevation thereof, slightly enlarged, showing the internally threaded member separated from the rod-like member and the hook means partly broken away.
Figure 7:
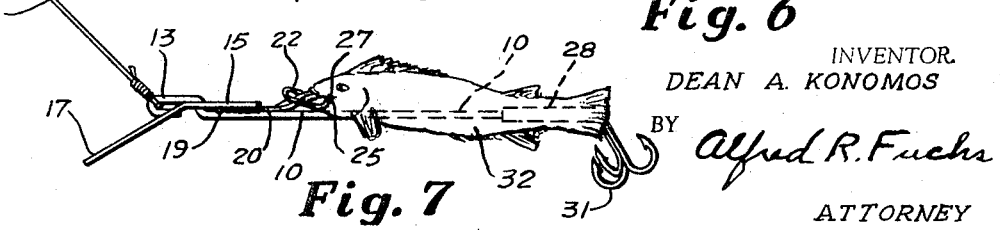
FIG. 7 is a side elevational view of the form of the invention shown in FIG. 1, on a reduced scale, showing a minnow mounted thereon.

Referring in detail to the drawings, in FIGS. 1, 2 and 7 is shown a fishing lure having a bait holder comprising a straight, rigid, rod-like bait impaling member 10, which is provided with a screw-threaded portion 11 at one end thereof and which terminates in a tapered end 12. Said rod-like portion is provided with an elongated open offset loop 13, to which a line 14 may be attached, as shown in FIG. 7. A deflector plate having a portion 15 extending substantially parallel to the length of the rod-like member 10 is mounted on said rod-like member, being secured thereto by means of securing means 16, such as solder, or by brazing, or in any other suitable manner. Said deflector plate has an inclined portion 17 extending at an oblique angle to the length of the rod-like member 10 and is provided with a stiffening rib 18, said loop extending through a slot in said deflector plate.

Gripping means is mounted on said rod-like member 10 adjacent the end thereof that carries the deflector plate, said gripping means having a transverse portion 19, which is secured to the rod-like member 10 by solder, or other securing means, that secures the deflector plate in position, a pair of lengthwise extending substantially parallel portions 20 and an inclined portion 21 that is provided with a loop 22 intermediate the ends thereof and an inclined portion 23 that passes through the loop portion 22. Extending from the inclined portion 21 toward the inclined portion 23 transversely to the length of the rod-like member 10 is a gripping finger 24 and extending from the inclined portion 23 toward the inclined portion 21 is a gripping finger 25, said gripping fingers having tapered or sharpened ends 26 and 27, which overlap each other slightly normally. The entire gripping member is made of spring wire so that the tendency is for the ends of the portions 24 and 25 that are directed toward each other to move toward each other into overlapping relation, being limited in their movement toward each other and away from each other by the loop 22.

Cooperating with the rod-like member 10 is a short straight hook carrying member 28, which is provided with an internally screw-threaded passage 29 extending inwardly from the one end thereof and has a ring 30 mounted thereon for loosely, swingingly mounting a multiple hook structure 31 thereon. The internally screw-threaded portion 29 of the hook mounting member 28 is adapted to be screw-threaded onto the threaded end portion of the rod-like member 10 in the manner shown in FIGS. 1 and 7.

In the form of the invention shown in FIGS. 1 and 2, the parts of the bait holder are first separated so as to expose the pointed or tapered end 12 of the impaling member 10 and the bait is then impaled thereon, the impaling member 10 being passed through the bait, such as a minnow 32 shown in FIG. 7. The bait is passed lengthwise along on the impaling member until it reaches a position in which the spring gripping member can be engaged therewith. This is done by pressing together the portions 20 thereof to separate the sharpened ends of the finger portions 23 and 24 that are directed toward each other to permit the passage of part of the head portion 32 of the minnow between the same, whereupon the portions 20 are released, causing the portions 23 and 24 of the gripping member to engage the head of the minnow holding it firmly in position. However, while the minnow 32 will be held firmly in a straight natural position on the bait holder, it will not be damaged by the spring gripping means, nor by the impaling member and can be removed and re-used. This is, because all that is necessary to remove the bait from the bait holder, is to squeeze together the two parallel portions 20 of the spring gripping means, to release it, detach the hook mounting member 28 from the impaling member 10 and slide the bait off the impaling member 10 lengthwise of the same, to the right in the drawings.

Instead of providing the fishing lure having my improved bait holder with a deflector plate, it may be provided with a weight at the head end thereof, being provided with what is commonly known as a lead head 33, which is mounted by soldering, or in some similar manner, on the end of the rod-like impaling member similar to that previously described, said weight 33 being mounted on said rod-like impaling member 10' on the end opposite that which is threaded and sharpened or tapered.

Figure 3:
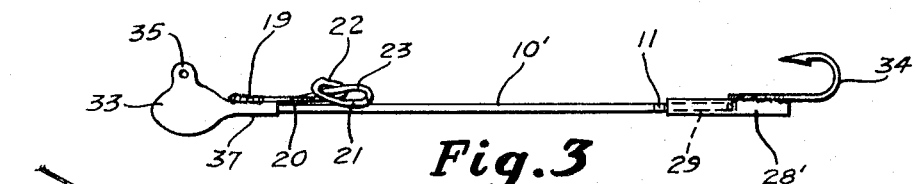
FIG. 3 is a view similar to FIG. 2 of a modification, provided with a weight for use on the bottom of a body of water.
Figure 4:
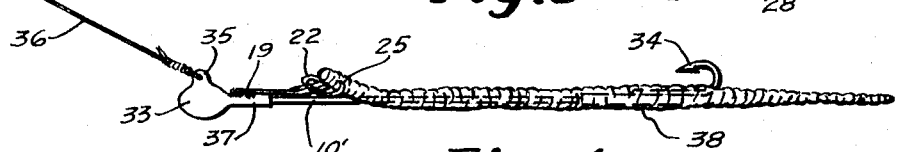
FIG. 4 is a view similar to FIG. 3, on a slightly reduced scale, of the form of the invention shown in FIG. 3, with a line attached thereto and a worm mounted thereon.

In the form of the invention shown in FIGS. 3 and 4 the internally screw-threaded hook carrying member 28' is provided with an internally threaded opening 29 cooperating with the threaded portion 11 of the rod-like member 10' in the same manner as previously described, but is provided with a hook 34 rigidly secured to the member 28' in the position shown in FIGS. 3 and 4 by soldering or in any other suitable manner. The weight 33 is provided with a perforated ear 35 for securing the line 36 thereto. The spring gripping member is made in the same manner as previously described and is mounted in a similar manner on the rod-like member 10', the transverse portion 19 thereof being secured to a neck portion 37 extending from the weight 33, which has the one end of the impaling member 10' secured therein. As the parts of the spring gripping member shown in FIGS. 3 and 4 are duplicates of the spring gripping member shown in FIGS. 1 and 2, the same reference numerals are applied to the corresponding parts thereof in FIGS. 3 and 4 as in FIGS. 1 and 2. In FIG. 4 a worm 38 is shown as being impaled on the member 10' and held in position by means of the gripping member having the finger portions 24 and 25 that are directed toward each other to grip the bait from opposite sides thereof. The worm 38 may be either a live worm or an artificial worm, as the mounting thereof on the bait holding means would be accomplished in substantially the same manner in the case of either live or artificial bait.

Figure 5:
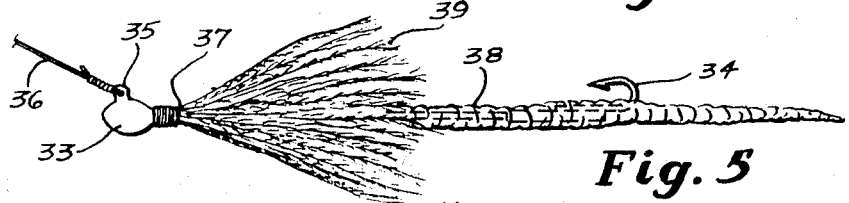
FIG. 5 is a view similar to FIG. 4 of the lure shown in FIG. 3 with a worm mounted thereon and hackle mounted on the head end thereof.

Referring now to FIG. 5, the same lure, slightly modified, as that shown in FIG. 4, is shown therein, a hackle 39 being mounted on the neck portion 37 in the manner shown in FIG. 5. Otherwise, the lure and the bait holding means provided thereon is the same as that shown in FIGS. 3 and 4, both forms of lures being adapted to be used on the bottom of a stream or other body of water.

Figure 6:
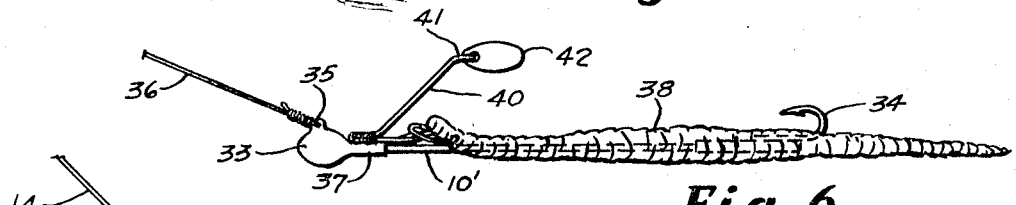
FIG. 6 is a view of a further modification, showing a worm mounted on a weighted lure provided with a spinner.

The weighted lure shown in FIGS. 3 and 4 can be provided with my bait holding means and still further modified as shown in FIG. 6, in which the weight 33 has a bracket in the form of an obliquely extending arm 40 extending therefrom, on the angular end 41 of which a spinner 42 is loosely mounted, the parts 40 and 41 being preferably made of a piece of wire and the spinner being made of a flat piece of sheet or plate metal. While a single spinner 42, and the mounting therefor, is shown in FIG. 6, it will be obvious that more than one spinner can be provided if desired.

In all forms of the invention the bait, whether live or artificial, can be impaled on the member 10 or 10' by separating the parts 10 and 28, or 10' and 28', and forcing the bait lengthwise onto the rod-like member 10' or 10, as the case may be. The bait is then fastened at one end thereof by means of the spring gripping means, and after said end has been fastened by said spring gripping means, the member 28 or 28' is screwed onto the member 10 or 10' to secure the bait in position between said member 28 or 28' and said spring gripping means. When it is desired to remove the bait, all that is necessary is to detach the member 28 or 28', release the spring gripping means and pull the bait off the impaling member 10 or 10' lengthwise, toward the right thereof, as viewed in the drawings.

What I claim is:

1. In a fishing lure, a bait holder comprising a straight rigid rod-like bait impaling member tapered at one end thereof to provide bait penetrating means thereon at said end of said impaling member, said rod-like member having an externally threaded portion adjacent said tapered end thereof, means on the other end of said rod-like member for attaching a line thereto extending endwise beyond said rod-like member, an internally threaded member engaging with said threaded portion of said rod-like member and extending endwise therefrom, hook means mounted on said internally threaded member, and a spring bait gripping member mounted on said rod-like member adjacent said other end thereof and extending toward said hook means from said other end of said rod-like member, said gripping member having portions directed toward each other and provided with tapered ends in position to penetrate the bait mounted on said rod-like member.

2. The fishing lure claimed in claim 1 in which said hook means comprises a hook rigidly mounted on said internally threaded member.

3. The fishing lure claimed in claim 1 in which said means for attaching a line to said rod-like member comprises a weight mounted on the other end of said rod-like member endwise beyond said spring bait gripping member.

References Cited by the Examiner

UNITED STATES PATENTS

| | | | |
|---|---|---|---|
| 315,967 | 4/1885 | Spencer. | |
| 881,805 | 3/1908 | Klein | 43—44.2 X |
| 1,717,376 | 6/1929 | Ellerbroek | 43—44.2 |
| 2,074,540 | 3/1937 | Dorsey | 43—44.6 |
| 2,164,708 | 7/1939 | Hadaway | 43—44.2 |

References Cited by the Applicant

UNITED STATES PATENTS

| | | |
|---|---|---|
| 1,207,588 | 12/1916 | Maus. |
| 2,078,816 | 4/1937 | Shenitz. |

SAMUEL KOREN, *Primary Examiner.*

ALDRICH F. MEDBERY, *Examiner.*

D. J. LEACH, *Assistant Examiner.*